United States Patent
Yeh (10) Patent No.: US 9,906,414 B2
(45) Date of Patent: Feb. 27, 2018

(54) NETWORK RELIABILITY EVALUATION METHOD FOR ACYCLIC NETWORK AND SYSTEM THEREOF

(71) Applicant: NATIONAL TSING HUA UNIVERSITY, Hsinchu (TW)

(72) Inventor: Wei-Chang Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 267 days.

(21) Appl. No.: 14/847,694

(22) Filed: Sep. 8, 2015

(65) Prior Publication Data

US 2016/0373326 A1 Dec. 22, 2016

(30) Foreign Application Priority Data

Jun. 17, 2015 (TW) .............................. 104119527 A (51) Int. Cl.
*H04L 12/24* (2006.01)

(52) U.S. Cl.
CPC .............. *H04L 41/12* (2013.01); *H04L 41/14* (2013.01)

(58) Field of Classification Search
CPC ....... H04L 9/0827; H04L 45/16; G06F 17/50; G06F 17/5086; G10L 15/083
See application file for complete search history.

(56) References Cited

U.S. PATENT DOCUMENTS

| 6,587,844 B1 * | 7/2003 | Mohri | G10L 15/083 704/256 |
|---|---|---|---|
| 7,719,988 B1 * | 5/2010 | Ruiz | H04L 45/16 370/237 |
| 2010/0313021 A1 * | 12/2010 | Xu | H04L 9/0827 713/168 |
| 2012/0004891 A1 * | 1/2012 | Rameau | G06F 17/50 703/6 |
| 2016/0063174 A1 * | 3/2016 | Rameau | G06F 17/5086 703/1 |

OTHER PUBLICATIONS

Jacek Jonczy and Rolf Haenni, "Network Reliability evaluation with propositional Directed Acyclic Graphs", Bern University of Applied Sciences, Biel, Switzerland, 7 pages.*
Wei-Chang Yeh, "The k-out-of-n acyclic multistate-node networks reliability evaluation using the universal generating function method", Department of Industtiral Engineering and Managment Engineering, National Tsing Hua University, Oct. 7, 2005, 9 pages.*

* cited by examiner

*Primary Examiner* — Dustin Nguyen
(74) *Attorney, Agent, or Firm* — Muncy, Geissler, Olds & Lowe, P.C.

(57) ABSTRACT

A network reliability evaluation method for an acyclic network and a system thereof are provided. The network reliability evaluation method searches all minimal paths from a source node to a sink source based on nodes according to the properties of the acyclic network. In conventional network reliability evaluation methods, searching all minimal paths is based on arcs. Therefore, the network reliability evaluation method and the system thereof can effectively reduce the complexity of calculation.

8 Claims, 6 Drawing Sheets

NETWORK RELIABILITY EVALUATION METHOD FOR ACYCLIC NETWORK AND SYSTEM THEREOF

CROSS-REFERENCE TO RELATED APPLICATION

This application claims the benefit of Taiwan Patent Application No. 104119527, filed on Jun. 17, 2015, in the Taiwan Intellectual Property Office, the disclosure of which is incorporated herein in its entirety by reference.

BACKGROUND OF THE INVENTION

1. Field of the Invention

The present disclosure generally relates to a network reliability evaluation method and a system thereof, in particular to a network reliability evaluation method for acyclic network and a system thereof.

2. Description of the Related Art

At present, many systems, such as computer and communication systems, power transmission and distribution systems, transportation systems, and oil/gas production systems, can be modeled as networks in the planning, designing, and control of systems. The conventional networks have a source node, some junction nodes and sink nodes. The information transmitted in the networks originates from the source node and the junction node plays the role of the transmission in the network, wherein the junction node transmits information through the arc. Finally, the information is transmitted to different sink nodes. Evaluating the probability of connecting the source node to the sink nodes is defined as the reliability evaluation of the network. The reliability evaluation is applied to be an important indicator for evaluating the network performance.

The network reliability evaluation method is executed after all the minimal paths (MP) or all the minimal cuts (MC) are found. Generally, the method of using the minimal path is better than that using the minimal cut intuitively. In terms of the conventional networks, the methods of searching all the minimal paths are executed based on the arcs, which is more complicated.

The acyclic network plays a crucial role in the various networks. In the binary-state and acyclic networks, all the arcs have working state and failed state, and the connections among the nodes do not have the parallel arcs and are free of the self-loop. Generally, the networks formed of the information set in sequence can be defined as the acyclic networks.

For example, the applications of scheduling problems, data compression, data backtracking, data processing networks, and so on all have the probability of being the acyclic network.

SUMMARY OF THE INVENTION

In view of the aforementioned technical problems, the present disclosure aims to provide a method of finding all the minimal paths in the acyclic network and calculating the reliability of the network by the characteristic of the acyclic network, so that the complexity of calculation can be reduced and the computing speed of the network reliability can be accelerated.

In accordance with one objective of the present disclosure, a network reliability evaluation method is provided, and the network reliability evaluation method is feasible for an acyclic network. The acyclic network includes a plurality of nodes and a plurality of arcs which are applied to connect the plurality of nodes. The plurality of nodes form a total node set $V_{tot}$, and the total node set $V_{tot}$ includes a source node and a sink node. The network reliability evaluation method includes the following step:

a. setting a node set V including the source node and the sink node by a processor, setting a count value k to be 0, setting a minimal path set $\Omega$ to be a null set, setting a $0^{th}$ corresponding node set $\theta_0$ to be a null set, setting an upper limit value and a lower limit value corresponding to the acyclic network, and executing the step b;

b. determining whether a number of the nodes in the node set $V_p$ is equal to the upper limit value by the processor, if so, executing the step f, if not executing the step b';

b'. determining whether there is a first node that belongs to a set $[V_{tot}-(U_{i=0}^{k}\theta_i \cup V_p)]$ and is an adjacent node of the node set $V_p$ by the processor, if so, the node set $V_p$ including the first node, adding the count value k by 1, setting the $k^{th}$ corresponding node set $\theta_k$ to be the first node, and executing the step c, if not, executing the step f;

c. determining whether the lower limit value is greater than the number of the nodes in the node set $V_p$ by the processor, if so, executing the step b, if not, executing the step d;

d. determining whether there is a path p formed of the plurality of arcs among the nodes in the node set $V_p$ passing all the nodes in the node set $V_p$ started from the source node to the sink node by the processor, if so, the minimal path set $\Omega$ comprising the path p and executing the step e, if not, executing the step d';

d'. determining whether there is a path p formed of the a plurality of arcs among the nodes in the node set $V_p$ without passing all the nodes in the node set $V_p$ started from the source node to the sink node or the other paths starting from the source node to the sink node is existing in the network formed of the set $[V_{tot}-(U_{i=0}^{k}\theta_i-V_p)]$ by the processor, if so, executing the step b, if not, executing, the step f;

e. determining whether the number of the nodes of the node set $V_p$ is equal to the upper limit value by the processor, if so, executing the step f, if not, executing the step b;

f. determining whether the number of the nodes of the node set $V_p$ is equal to 2, if so, executing the step g, if not, executing, the step f';

f'. determining whether there is a second node that belongs to the set $[V_{tot}-(U_{i=0}^{k}\theta_i \cup V_p)]$ and is an adjacent node of the node set $V_p$, if so, the second node replacing the last node in the node set $V_p$, the $k^{th}$ corresponding node set $\theta_k$ including the second node, and executing the step d, if not, deleting the last node in the node set $V_p$, subtracting the count value k by 1, and executing the step f, and g. calculating a network reliability by the processor according to all the paths comprised in the minimal path set $\Omega$.

Preferably, a lower limit value may be the number of the nodes in a shortest path starting from the source node to the sink node.

Preferably, an upper limit value may be the number of the nodes in a longest path starting from the source node to the sink node.

Preferably, after the processor determines that the number of the nodes is not equal to the upper limit value in the step e and before the step b is executed, the network reliability evaluation method further includes the step e': determining whether there is a third node v that belongs to the set $[V_{tot}-(\cup_{i=0}^{k}\theta_i \cup V_p)]$ and is close adjacent node of the node set $V_p$ by the processor, if so, the node set $V_p$ including the third node v, adding the count value k by 1, setting the $k^{th}$ corresponding node set $\theta_k$ including the third node v, and the minimal path set $\Omega$ including the path $(p-\{e_{ij}\})\cup(\{e_{iv}\},\{e_{vj}\})$, wherein $e_{ij}$ denotes an arc between a node i and a node j in the node set $V_p$, $e_{iv}$ denotes an arc between the node i and the third node v, $e_{yj}$ denotes an arc between the third node v and the node j, and the step e is executed, if not, the step b is executed.

In accordance with another objective of the present disclosure, a network reliability evaluation system which is feasible for an acyclic network is provided, which including a plurality of nodes and a plurality of arcs connected to the plurality of nodes, the plurality of nodes forming a total node set $V_{tot}$, the total node set $V_{tot}$ including a source node and a sink node, and the network reliability evaluation system includes a memory which stores an algorithm, and a processor which connects to the acyclic network and the memory, and outputs a network reliability after the algorithm is executed, wherein, the algorithm includes following steps:

a. setting a node set $V_p$ including the source node and the sink node, setting a count value k to be 0, setting a minimal path $\Omega$ to be a null set, setting a $0^{th}$ corresponding node set $\theta_0$ to be a null set, setting an upper limit value and a lower limit value corresponding to the acyclic network, and executing the step b;

b. determining whether a number of the nodes of the node set $V_p$ is equal to the upper limit value, if so, executing the step f, if not, executing the step b';

b' determining whether there is a first node that belongs to the set $[V_{tot}-(\cup_{i=0}^{k}\theta_i \cup V_p)]$ and is an adjacent node of the node set $V_p$, if so, the node set $V_p$ including the first node, adding the count value k by 1, setting the $k^{th}$ corresponding node set $\theta_k$ to be the first node, and executing the step c, if not, executing the step f;

c. determining whether the lower limit value is greater than the number of the nodes in the node set $V_p$, if so, executing the step b, if not, executing the step d;

d. determining whether there is a path p formed of the plurality of arcs among the nodes in the node set $V_p$ passing all the nodes in the node set $V_p$ started from the source node to the sink node, if so, the minimal path set $\Omega$ comprising the path p and executing the step e; if not, executing the step d';

d' determining whether there is a path p formed of the a plurality of arcs among the nodes in the node set $V_p$ without passing all the nodes in the node set $V_p$ started from the source node to the sink node of the other paths starting from the source node to the sink node is existing in the network formed of the set $[V_{tot}-(\cup_{i=0}^{k}\theta_i - V_p)]$, if so, executing the step b; if not, executing the step f;

e. determining whether the number of the nodes of the node set $V_p$ is equal to the upper limit value, if so, executing the step f, if not, executing the step b;

f. determining whether the number of the nodes of the node set $V_p$ is equal to 2, if so, executing the step g, if not, executing the step f';

f'. determining whether there is a second node that belongs to the set $[V_{tot}-(\cup_{i=0}^{k}\theta_i \cup V_p)]$ and is an adjacent node of the node set $V_p$, if so, the second node replacing the last node in the node set $V_p$, the $k^{th}$ corresponding node set $\theta_k$ including the second node, and executing the step d, if not, deleting the last node in the node set $V_p$, subtracting the count value k by 1, and executing the step f, and g. calculating a network reliability by the processor according to all the paths comprised in the minimal path set $\Omega$.

Preferably, a lower limit value may be the number of the nodes in the shortest path starting from the source node to the sink node.

Preferably, an upper limit value may be the number of the nodes in the longest path starting from the source node to the sink node.

Preferably, after the algorithm determines that the number of the nodes is not equal to the upper limit value in the step e and before the step b is executed, the algorithm further includes the step e': determining whether there is a third lode v that belongs to the set $[V_{tot}-(\cup_{i=0}^{k}\theta_i \cup V_p)]$ and is a close adjacent lode of the node set $V_p$, if so, the node set $V_p$ including the third node v, adding the count value k by 1, setting the $k^{th}$ corresponding node set $\theta_k$ including the third node v, and the minimal path set $\Omega$ including the path $(p=\{e_{ij}\})\cup(\{e_{iv}\},\{e_{vj}\})$, wherein $e_{ij}$ denotes an arc between a node i and a node j in the node set $V_p$, $e_{iv}$ denotes an arc between the node i and the third node v, $e_{yj}$ denotes an arc between the third node v and the node j and the step e is executed, if not, the step b is executed.

As mentioned previously, a network reliability evaluation method for acyclic network and a system thereof of the present disclosure may have one or more advantages as follows.

1. The network reliability evaluation method for acyclic network and the system thereof apply the characteristic of the acyclic network to search all the minimal paths, so as to reduce the complexity of calculation.

2. The network reliability evaluation method for acyclic network and the system thereof exclude the node set which has the least probability of having the minimal path in advance according to the lower limit value and upper limit value. Thereby, the efficiency of calculation is promoted.

3. The network reliability evaluation method for acyclic network and the system thereof are able to find out the other minimal paths rapidly by verifying the existence of the close adjacent node of the node set.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present invention, the components, process steps, and data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable. Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
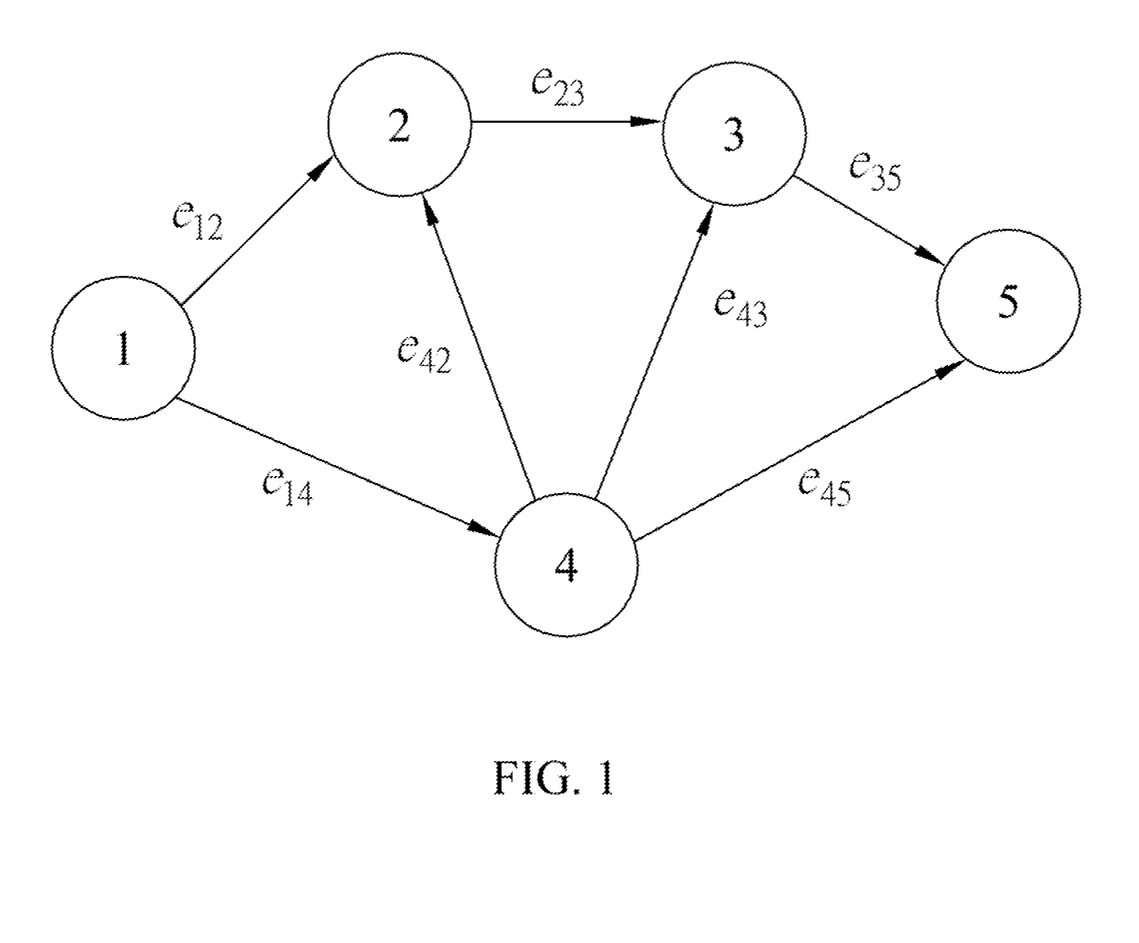
FIG. 1 is a schematic diagram of an acyclic network of the present disclosure.

Please refer to FIG. 1 which is a schematic diagram for showing an acyclic network having five nodes. A shown in the FIGS. 1, 2, 3, 4, and 5 indicate nodes respectively. 1 denotes a source node and 5 denotes a sink node. Here, $e_{12}$, $e_{14}$, $e_{23}$, $e_{35}$, $e_{43}$ $e_{43}$ and $e_{45}$ are arcs which are used to connect to each of the nodes. The parentheses { } denotes the set of the elements contained in the parentheses. |•| denotes the element number. Here, if "•" is an arc set, |•| denotes the number of the arcs in the set. If "•" is a node set, |•| denotes the number of the nodes in the set. The description of certain terminologies applied in the present disclosure will be explained as follows accompanying FIG. 1.

The minimal path (MP) is applied to denote an arc set which forms a path, and when an arc is removed from the arc set, the arc set is not the minimal path anymore. For example, in FIG. 1, the arc set $\{e_{14}, e_{42}, e_{23}, e_{35}\}$ forms a path where the nodes 1, 4, 2, 3 and 5 pass through sequentially. When any of the arcs is removed, the remaining arcs do not include the path in which theses nodes pass through. Hence, the arc set $\{e_{14}, e_{42}, e_{23}, e_{35}\}$ can be a minimal path.

The minimal path node subset (MPN) is applied to denote a node set corresponding to the minimal path. For example, the MPN which the MP $\{e_{14}, e_{42}, e_{23}, e_{45}\}$ corresponds to {1, 4, 2, 3, 5}, and the MPN which the MP $\{e_{14}, e_{45}\}$ corresponds to is the MP {1, 4, 5}.

Figure 2:
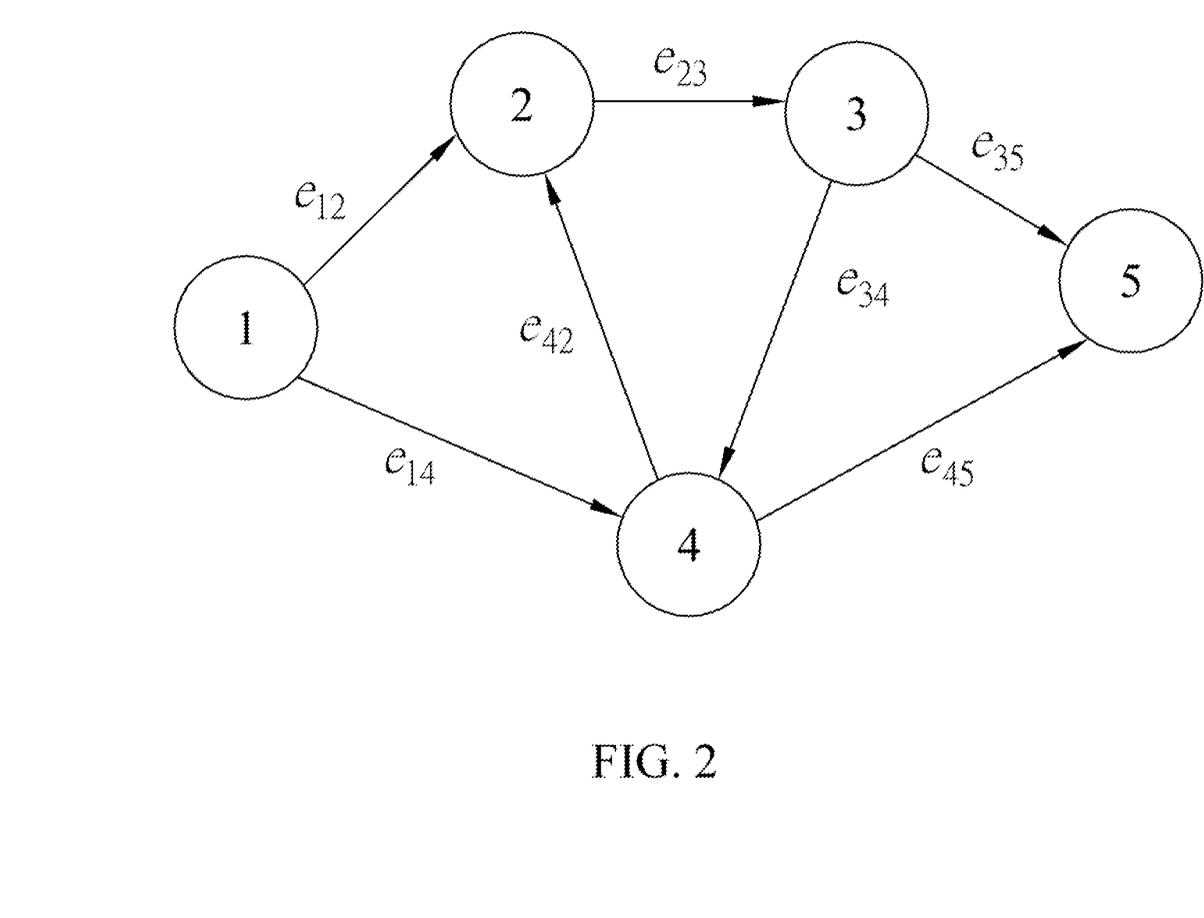
FIG. 2 is a schematic diagram of a cycle network with cyclic network of the present disclosure, compared with FIG. 1.

The acyclic network is a network without cycle, and the acyclic network applied in the present disclosure satisfies with the following three conditions. (1) Each node in the network is perfectly reliable, totally. (2) Each arc in the network has working state and failed state. (3) The network does not have cyclic or parallel arcs and is free of the self-loop. Specifically, it can be referred to FIG. 1 and FIG. 2 together. FIG. 2 is a schematic diagram of a cycle network with cyclic network of the present disclosure, compared with FIG. 1. In FIG. 2, the arc $e_{34}$ has an opposite direction with the arc $e_{43}$ shown in FIG. 1, so that the network shown in FIG. 2 includes a cyclic arc set $\{e_{23}, e_{34}, e_{42}\}$. As a result, the network shown in FIG. 2 is not an acyclic network.

The adjacent node applied in the present disclosure indicates that if a node i is the adjacent node of a node set V*, it means that the node i does not belong to the node set V*, and the arc $e_{ij}$ existed in the entire network connects to the node i and a certain node j in the node set V*.

Figure 3:
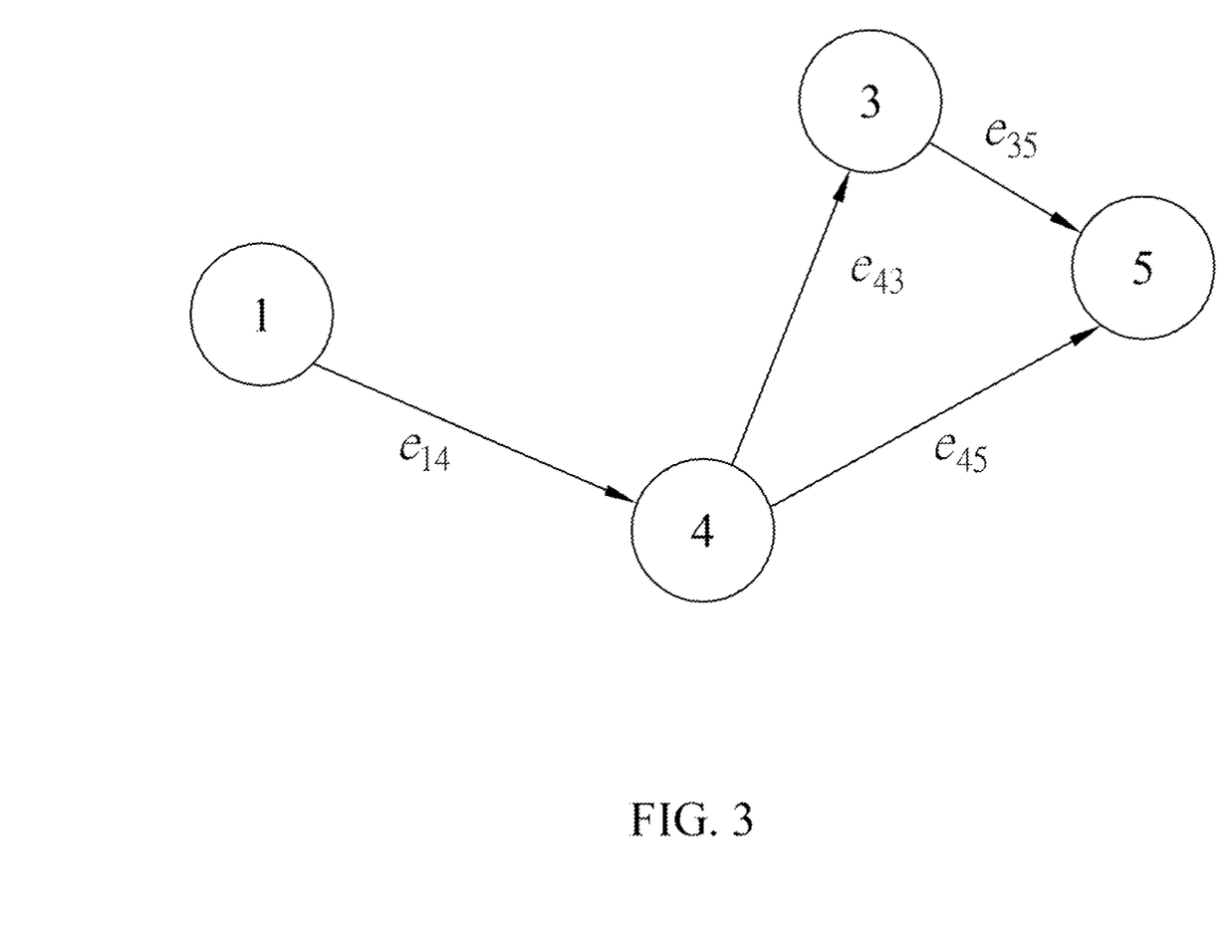
FIG. 3 is a schematic diagram of a network formed of partial nodes of an acyclic network of the present disclosure.

The close adjacent node applied in the present disclosure indicates that if a node i is the close adjacent node of a node set V*, it means that the node i does not belong to the node set V*, and the arcs $e_{ij}$, $e_{ik}$ and $e_{ik}$ existed in the entire network respectively connect to the node i and the at least two nodes j and k in the node set V*. Specifically, it can be referred to FIG. 3, which is a schematic diagram of a network formed of partial nodes of an acyclic network of the present disclosure. As shown in FIG. 3, the node 3 is the close adjacent node of the node set {1, 4, 5} as the node 3 does not belong to the node set {1, 4, 5}. Besides, the arcs $e_{43}$, $e_{35}$ and $e_{45}$ respectively connect to the node 3 and the nodes 4 and 5 in the node set {1, 4, 5}.

The characteristic of the acyclic network is described as follows, and the characteristic of the acyclic network accelerates the process of finding out all the MPs.

Firstly, it has to be addressed that in the conventional network, a MPN set may correspond to more than one MP. For example, as shown in FIG. 2, the MPN {1, 2, 3, 4, 5} corresponds to the MP $\{e_{14}, e_{42}, e_{23}, e_{35}\}$ and the MP $\{e_{12}, e_{23}, e_{34}, e_{45}\}$ simultaneously.

On the contrary, in the acyclic network, a MPN set only corresponds to one MP. For the sake of proving such characteristic, it has to be addressed that each MPN set has the longest path, and the longest path passes through all the nodes of the MPN set. Hence, the definition of the MPN proves that the MPN is a node set defined by a MP which passes through all the nodes, so that the MP exists and belongs to the aforementioned longest path absolutely. Afterwards, what has to be proven is that a MPN set only has a longest path, and the longest path is the MP that the MPN set corresponds to in the acyclic network. To the contrary, if two paths P1 and P2, which have respective longest paths, are found in a MPN set, the sequences of the two paths P1 and P2 passing through the node are not the same as the networks do not have the parallel arcs. That is to say, the MPN set has the node a and the node b, and the path P1 passes through the node a and then passes through the node b of the MPN set, however, the path P2 passes through the node b and then passes through the node a of the MPN set. As a result, it can be found that the longest path P1 necessarily has a secondary path P3 from the node a to the node b and the longest path P2 necessarily has a secondary path P4 from the node b to the node a. So, a cycle between the node a and the node b forms between the secondary path P3 and the secondary path P4 naturally, which does not conform to the foregoing definition of the acyclic network. Therefore, it proves that a MPN set only has a longest path, and the longest path is certainly the MP which the MPN set corresponds to.

As the MPN and the MP in the acyclic network have the one-to-one characteristic, when all the MPs have to be found out, all the MPNs found can be applied to the substitutes.

Comparing to the prior art, an algorithm used to find out all the MPs is performed according to the arcs, and the algorithm applied in the present disclosure is to find out all the MPs based on the nodes by the MPN. The amount of the arcs in the network is denoted by |E|, and the number of the nodes is denoted by |V|. Generally, the computational complexity of |E| and may have the following relationship: O(|E|)=O(|V²|). As a result, the algorithm applied in the present disclosure can effectively reduce the complexity of calculation so as to accelerate the calculation speed and to save the consumed resource for the calculation.

As a result, a network reliability evaluation method applied in the present disclosure can calculate the network reliability for an acyclic network according to the characteristic of the acyclic network. The acyclic network mentioned herein includes a plurality of nodes and a plurality of arcs connected to the plurality of nodes. The plurality of nodes form a total node set $V_{tot}$, and the total node set $V_{tot}$ includes a source node and a sink node. Specifically, the embodiment of a network reliability evaluation method applied in the present disclosure includes the following steps.

a. setting a node set $V_p$ comprising the source node and the sink node by a processor, setting a count value k to be 0, setting a minimal path set Ω to be a null set, setting a $0^{th}$ corresponding node set $\theta_0$ to be a null set, setting an upper limit value and a lower limit value corresponding to the acyclic network, and executing the step b;

b. determining whether a number of the nodes in the node set $V_p$ is equal to the upper limit value by the processor, if so, executing the step f, if not, executing the step b';

b'. determining whether there is a first node that belongs to the set $[V_{tot}-(U_{i=0}^{k}\theta_i \cup V_p)]$ and is an adjacent node of the node set $V_p$ by the processor, if so, the node set $V_p$ including the first node, adding the count value k by 1, setting the $k^{th}$ corresponding node set $\theta_k$ to be the first node, and executing the step c, if not executing the step f;

c. determining whether the lower limit value is greater than the number of the nodes in the node set $V_p$ by the processor, if so, executing the step b, if not, executing the step d;

d. determining whether there is a path p formed of the plurality of arcs among the nodes in the node set $V_p$ passing all the nodes in the node set $V_p$ started from the source node to the sink node by the processor, if so, the minimal path set Ω comprising the path p and executing the step e, if not, executing the step d';

d'. determining whether there is a path p formed of the a plurality of arcs among the nodes in the node set $V_p$ without passing all the nodes in the node set $V_p$ started from the source node to the sink node or the other paths starting from the source node to the sink node is existing in the network formed of the set $[V_{tot}-(U_{i=0}^{k}\theta_i-V_p)]$ by the processor, if so, executing the step b, if not, executing the step f;

e. determining whether the number of the nodes of the node set $V_p$ is equal to the upper limit value by the processor, if so, executing the step f, if not, executing the step b;

f. determining whether the number of the nodes of the node set $V_p$ is equal to 2, if so, executing the step g, if not, executing the step f';

f'. determining whether there is a second node that belongs to the set $[V_{tot}-(U_{i=0}^{k}\theta_i \cup V_p)]$ and is the adjacent node of the node set $V_p$, if so, the second node replacing the last node in the node set $V_p$, the $k^{th}$ corresponding node set $\theta_k$ comprising the second node, and executing the step d, if not, deleting the last node in the node set $V_p$, subtracting the count value k by 1, and executing the step f, and g. calculating a network reliability by the processor according to all the paths comprised in the minimal path set Ω.

Figure 4:
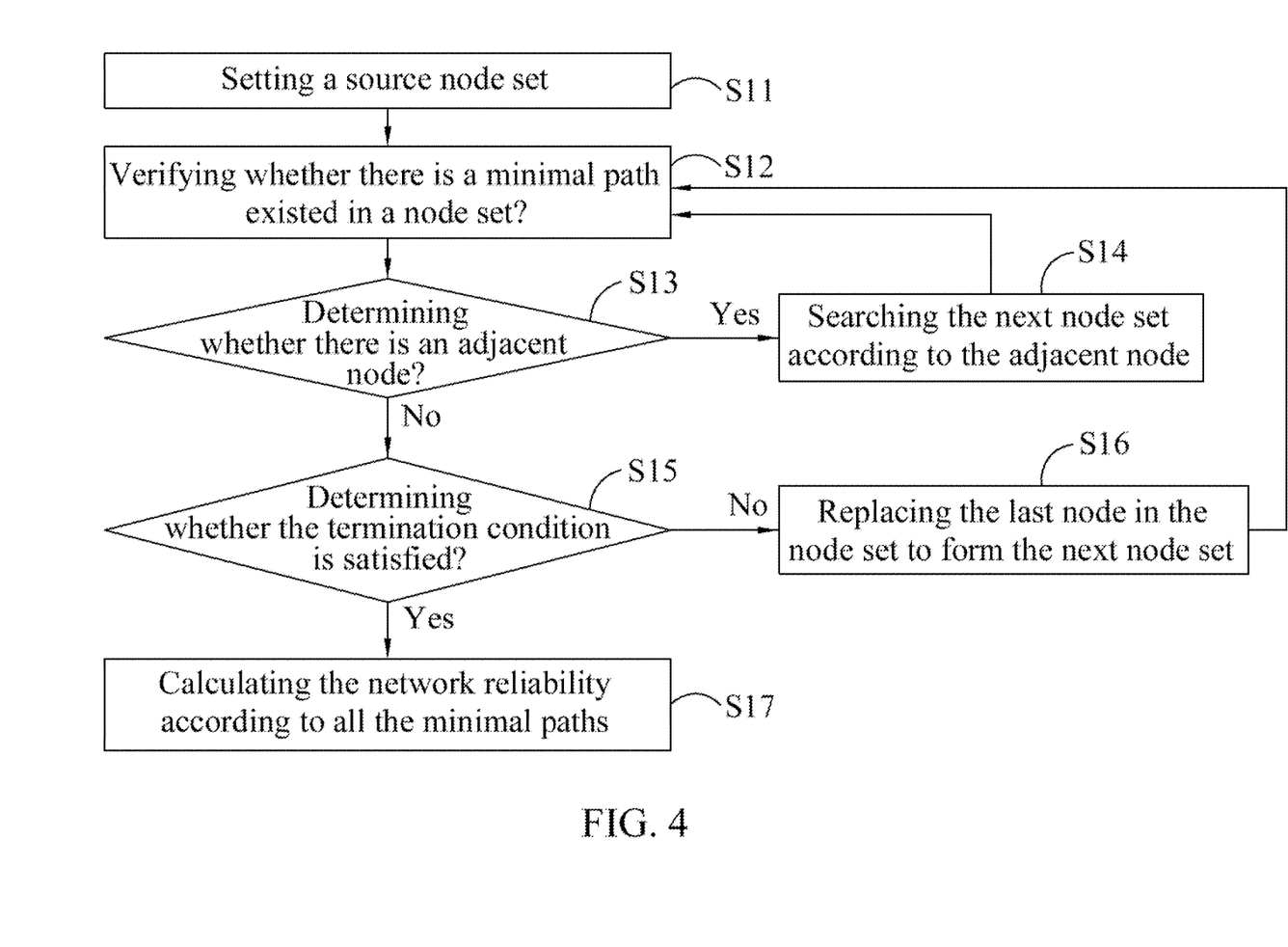
FIG. 4 is a schematic diagram of the first embodiment of a network reliability evaluation method of the present disclosure.

The detailed steps of the first embodiment of a network reliability evaluation method applied in the present disclosure have been mentioned as above, and the concept can be further referred to FIG. 4, which is a schematic diagram of the first embodiment of a network reliability evaluation method of the present disclosure. As shown in FIG. 4, the practical procedures are divided into several steps. In step S11, the processor is provided to set a node set which has been verified. Here, the verified node set applied in the embodiment is the node set formed of the source node and the sink node, and the other variables and counter values which need to be set in advance are set in this step. The step S11 corresponds to the step a. In the step S12, the processor starts to verify whether there is a MP existed in the network formed of the node set, and if the MP does exist, the MP is recorded in the minimal path set Ω. In order to accelerate the verification, the upper limit value and the lower limit value of the node set are set respectively. If the number of the nodes of the node set is greater than the upper limit value or smaller than the lower limit value, the processor excludes the probability of the existence of the MP in the network formed of the node set. Substantially, the step S12 corresponds to most steps from the step b to the step e. In the step S13, the processor determines the next node set that is to be verified according to the presence of the adjacent node of the node set. Substantially, the step S13 corresponds to one part of the step b'. If the adjacent node does exist in the node set, in the step S14, the processor adds one of the adjacent nodes to the node set to be a new node set, and the new node set becomes the next node set that is to be verified through the step S13. Substantially, the step S14 corresponds to another part of the step b. If the node set does not have the adjacent node, in the step S15, the processor determines whether the algorithm which is applied to search to all the MPs satisfies with a termination condition. In the embodiment, the termination condition indicates two nodes left in the node set. Substantially, the step S15 corresponds to the step f. If the node set is not satisfied with the termination condition yet, in the step S16, the processor determines the next node set that is to be verified. In the embodiment, the manner of determining the next node set under the circumstances of the node set not having the adjacent node is to replace the last node of the node set. The manner can be detailed more concretely in the next embodiment. Substantially, the step S16 corresponds to the step f'. If the node set satisfies with the termination condition, it means that all the possible node sets in the network are verified, and thus, the minimal path Ω includes all the MPs in the network. As a result, in the step S17, the processor calculates the network reliability according to all the MPs. As the method applied to calculate the network reliability according to all the MPs has been seen in the conventional algorithm, the unnecessary details are longer given herein. Substantially, the step S17 corresponds to the step g.

It is noteworthy that although the foregoing steps only aim to the condition with respect to one source node of the acyclic network to one sink node, it can be corrected easily to become one source node to multiple sink nodes, multiple source nodes to one sink node, or multiple source nodes to multiple sink nodes. Listing the source nodes and the sink nodes and accordingly matching them one-by-one and applying the aforementioned method to each source node and sink node is able to calculate the network reliability corresponding to each of the source nodes and sink nodes.

For the sake of further accelerating the calculation speed, the predetermined upper limit value and the lower limit value are applied to exclude the impossible node set before verifying whether the node set includes the MP. Specifically, the lower limit value is a number of the nodes in the shortest path starting from the source node to the sink node and the upper limit value is a number of the nodes in the longest path starting from the source node to the sink node. The Shortest and the longest paths mentioned herein aim to the entire network. Please refer to FIG. 1 again. As shown in FIG. 1, the acyclic network has the longest path $\{e_{14}, e_{42}, e_{23}, e_{35}\}$ which passes through five nodes, and thus, the upper limit value can be set to be 5. Similarly, the acyclic network sown in FIG. 1 has the minimal path $\{e_{14}, e_{45}\}$, which passes through three nodes, and thus, the lower limit value can be set to be 3. Therefore, when the number of the node sets that is to be verified is greater than the upper limit value or smaller than the lower limit value, the processor directly determines that the network formed of the node set is unable to include the MP, so that the further verification is unnecessary to be performed. As the method applied to search the longest and the shortest paths in the network has been disclosed in the conventional algorithm, the unnecessary details are no longer given herein.

Preferably, in the step e, when the processor determines that the number of the node sets $V_p$ is not equal to the upper limit value before executing the step b, the network reliability evaluation method further includes the following step e'. The step e' is as follows.

e': determining whether there is a third node that belongs to $[V_{tot}-(U_{i=0}^{k}\theta_i \cup V_p)]$ set and is a close adjacent node in the node set $V_p$, if so, the node set $V_p$ including the third node v, adding the count value k by 1, the $k^{th}$ corresponding node set $\theta_k$ including the third node v, the minimal path set $\Omega$ including the path $(p=\{e_{ij}\}) \cup (\{e_{iv}\},\{e_{vj}\})$, wherein $e_{ij}$ denotes the arc between a node i and a node j in the node set $V_p$, $e_{jv}$ denotes the arc between the node i and the third node v, $e_{vi}$ denotes the arc between the third node v and the node j, and executing the step, if not, executing the step b.

Figure 5:
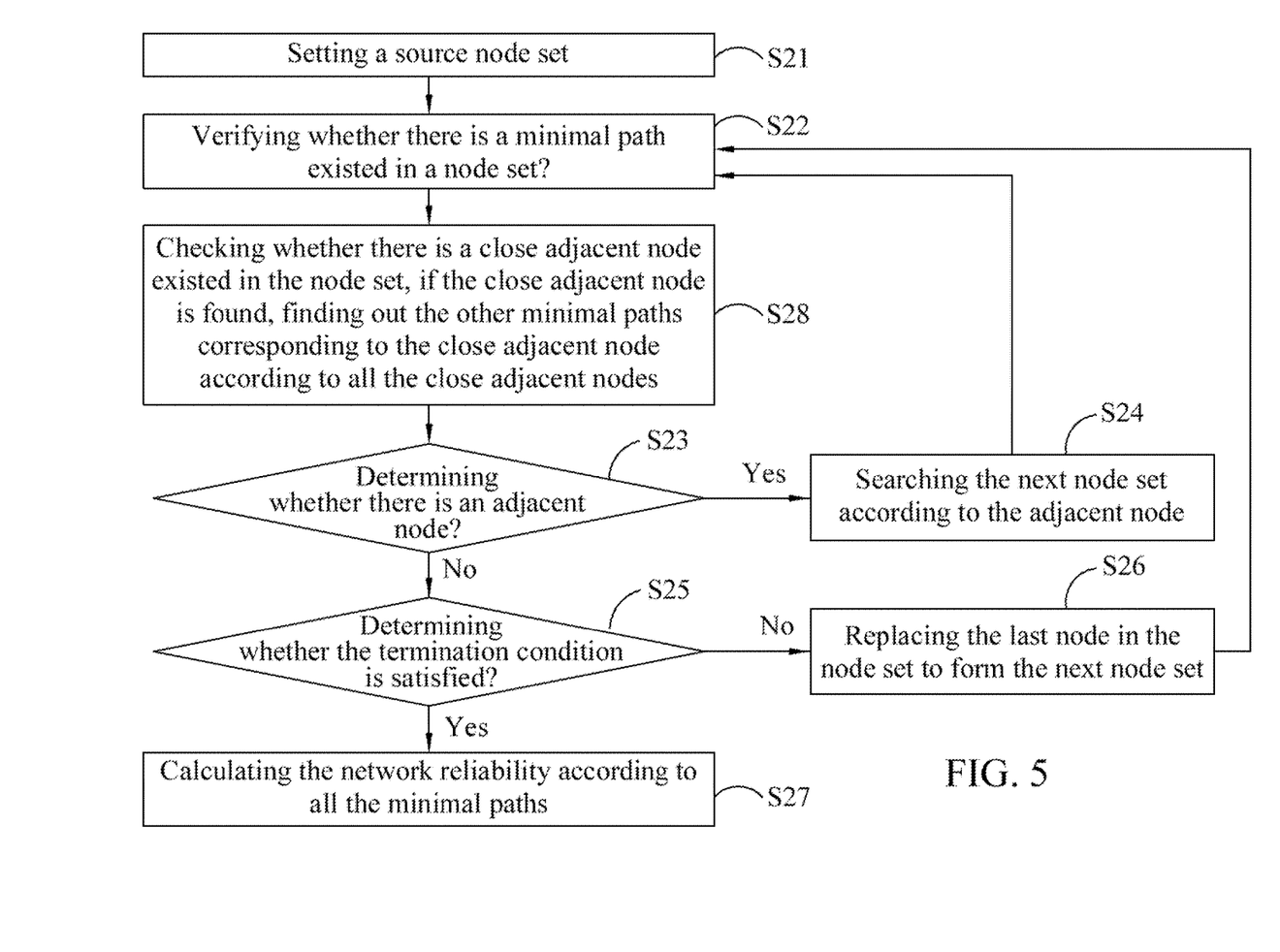
FIG. 5 is a schematic diagram of the second embodiment of a network reliability evaluation method of the present disclosure.

Here, the close adjacent node defined in the algorithm applied in the present disclosure is used to accelerate the calculation process. Please refer to FIG. 5, which is a schematic diagram of the second embodiment of a network reliability evaluation method of the present disclosure. The steps from S21 to S27 of the second embodiment shown in FIG. 5 substantially correspond to the steps from S11 to S17 of the first embodiment shown in FIG. 4. The difference between the two embodiments lies in that in the second embodiment shown in FIG. 5, the step S28 is executed before the step S23 is executed. In the embodiment, the step S28 corresponds to the step e', substantially. That is to say, in the second embodiment, it is to confirm whether the node set has the close adjacent node after the network formed of the node set is verified whether it includes the MP. If the node set has the close adjacent node, the network formed of the verified node set and the new node set having the close adjacent node may necessarily include another MP. Please refer to FIG. 3 again. As shown in the FIG., the network formed of the node set $\{1, 4, 5\}$ includes the MP $\{e_{14}, e_{45}\}$, and the node 3 is the close adjacent node of the node set $\{1, 4, 5\}$. Hence, the network formed of the verified node set $\{1, 4, 5\}$ and the new node set $\{1, 3, 4, 5\}$ having the close adjacent node of the node 3 certainly includes another MP $\{e_{14}, e_{43}, e_{35}\}$. As a result, by means of the characteristic of the close adjacent node is able to find out the next node set including the MP rapidly.

Figure 6:
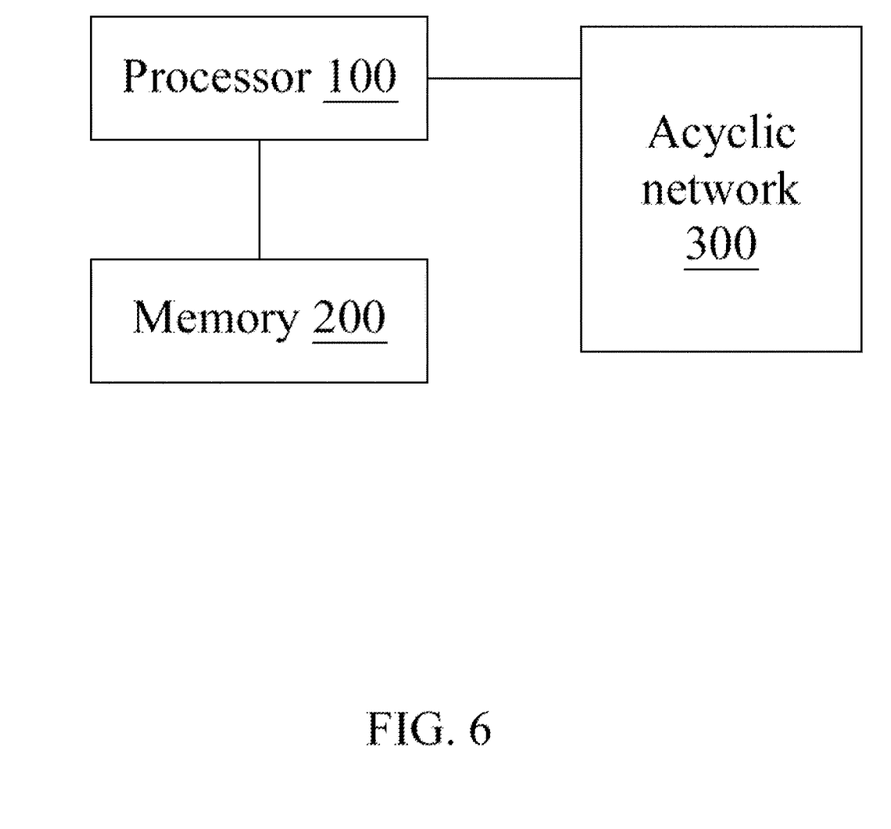
FIG. 6 is a schematic diagram of the third embodiment of a network reliability evaluation system of the present disclosure.

Please refer to FIG. 6 which is a schematic diagram of the third embodiment of a network reliability evaluation system of the present disclosure. As shown in the figure, the network reliability evaluation system of the present disclosure includes a processor 100 and a memory 200. The processor 100 connects to a target acyclic network 300 and the memory 200. The memory 200 stores an algorithm applied to the aforementioned network reliability evaluation method. In practice, the processor 100 receives the information about the node and the arc from the acyclic network 300 and executes a series of commands included in the algorithm received from the memory 200. Afterwards, the processor 100 outputs the network reliability of the acyclic network 300 and determines whether it satisfies with the requirements. If the network reliability of the acyclic network 300 does not satisfy with the requirements, the structure of the acyclic network 300 can be adjusted.

The flowing steps are applied to concretely describe the implementation of the second embodiment of the network reliability evaluation method of the present disclosure which is applied to the acyclic network shown in FIG. 1.

The step a: the node set $V_p=\{1, 5\}$, the counter k=0, and the minimal path set $\Omega=\{\}$ are set. Here, the minimal path set $\Omega$ is the position for saving the MP. The $0^{th}$ corresponding node set $\theta_0=\{\}$ is set. The maximal value corresponding to the acyclic network is $L_{ub}$=5, and the minimal value corresponding to the acyclic network is $L_{lb}$=3. Next, the step b is executed.

The step b: as $|V_p|$=2<$L_{ub}$, the step b' is executed.

The step b': as the node 2 is the adjacent node of the node set $V_p=\{1, 5\}$ and belongs to the set $[V_{tot}-(U_{i=0}^{k}\theta_i \cup V_p)]=\{2, 3, 4\}$, the node set $V_p$ includes the node 2, so $V_p=\{1, 5, 2\}$; the counter k is added by 1, so k=1 the first corresponding node set $\theta_1$ includes the node 2, and $\theta_1=\{2\}$. Afterwards, the step c is executed.

The step c: as $L_{lb}=|V_p|$=3, the step d is executed.

The step d: as the network formed of the node set $V_p=\{1, 5, 2\}$ excludes the path starting from the source node 1 to the sink node 5 via all the nodes in the $V_p$, the step d' is executed.

The step d': as the network formed of the set $[V_{tot}-(U_{i=0}^{k}\theta_i-V_p)]=\{1, 2, 3, 4, 5\}$ includes the path starting from the source node 1 to the sink node 5, the step b is executed.

The step b: as $|V_p|$=3<$L_{ub}$=5, the step b' is executed.

The step b': as the node 3 is the adjacent node of the node set $V_p=\{1, 5, 2\}$ and belongs to the set $[V_{tot}-(U_{i=0}^{k}\theta_i-V_p)]=\{3, 4\}$, the node set $V_p$ includes the node 3, so $V_p=\{1, 5, 2, 3\}$; the counter k is added by 1, so k=2, and the second corresponding node set $\theta_2$ includes the node 3, and $\theta_2=\{3\}$. Afterwards, the step c is executed.

The step c: as $L_{lb}$=3<$|V_p|$=4, the step d is executed.

The step d: as the network formed of the $V_p=\{1, 5, 2, 3\}$ includes the path p starting from the source node 1 to the sink node 5 via all the nodes in $V_p$, so p=$\{e_{12}, e_{23}, e_{35}\}$, the minimal path $\Omega$ includes the path p, and then the step e is executed.

The step e: as $L_{ub}$=5>$|V_p|$=4, the step e' is executed.

The step e': as the node 4 belongs to the set $[V_{tot}-(U_{i=0}^{k}\theta_i \cup V_p)]=\{4\}$ and is the close adjacent node of the node set $V_p$, the node set $V_p$ includes the node 4, so $V_p=\{1, 5, 2, 3, 4\}$; the count value k is added by 1, so k=3, the minimal path $\Omega$ includes the path $(p=\{e_{ij}\}) \cup (\{e_{iv}\},\{e_{vj}\})=\{e_{14}, e_{42}, e_{23}, e_{35}\}$, and then the step e is executed.

The step e: as $L_{ub}=|V_p|$=5, the step f is executed.

The step f: as $L_{lb}$=2<$|V_p|$=5, the step f' is executed.

The step f': as there are no nodes that belong to the set $[V_{tot}-(U_{i=0}^{k}\theta_i \cup V_p)]=\{\}$ and are the adjacent node of the node set $V_p$, the last node 4 of the node set $V_p$ is deleted, so $V_p=\{1, 5, 2, 3\}$, the count value k is subtracted by 1, so k=2, and then the step f is executed.

The step f: as $L_{lb}=2<|V_p|=4$, the step f' is executed.

The step f': as the node 4 belongs to the set $[V_{tot}-(U_{i=0}{}^i\theta_i \cup V_p)]=\{4\}$ and is the adjacent node of the node set $V_p$, the node 4 replaces the last node 3 in the node set $V_p$, $V_p=\{1, 5, 2, 4\}$, and the second corresponding node set $\theta_2$ includes the node 4, $\theta=\{4, 3\}$. Afterwards, the step d is executed.

The step d: as the network formed of the node set $V_p=\{1, 5, 2, 4\}$ excludes the path starting from the source node 1 to the sink node 5 via all the nodes in $V_p$, the step d' is executed.

The step d': as the network formed of $V_p=\{1, 5, 2, 4\}$ includes the path $\{e_{14}, e_{45}\}$ starting from the source node 1 to the sink node 5 but excludes all the nodes in the node set $V_p$ which started from source node 1 to the sink node 5, the step b is executed.

The step b: as $|V_p|=4<L_{ub}=5$, the step b' is executed.

The step b': as there are no nodes that belong to the set $[V_{tot}-(U_{i=0}{}^k\theta_i \cup V_p)]=\{\ \}$ and are the adjacent node of the node set $V_p$, the step f is executed.

The step f: as $L_{lb}=2<|V_p|=4$, the step f' is executed.

The step f': as there are no nodes that belong to set $[V_{tot}-(U_{i+0}{}^k\theta_i \cup V_p)]=\{\ \}$ and are the adjacent node of the node set $V_p$, the last node 4 of the node set $V_p$ is deleted, so $V_p=\{5, 2\}$; the count value k is subtracted by 1, and then the step f is executed.

The step f: t as $L_{lb}=2<|V_p|=3$, he step f' is executed.

The step f': as the node 3 belongs to the set $[V_{tot}-(U_{i+0}{}^k\theta_i \cup V_p)]=\{3, 4\}$ and is the adjacent node of the node set $V_p$, the node 3 replaces the last node 2 in the node set $V_p$, so $V_p=\{1, 5, 3\}$; and the first corresponding node set $\theta_1$ includes the node 3, $\theta_1=\{2, 3\}$. Afterwards, the step d is executed.

The step d: as the network formed of the node set $V_p=\{1, 5, 3\}$ excludes the path starting from the source node 1 to the sink node 5 via all the nodes in $V_p$, the step d' is executed.

The step d': as the network formed the set $[V_{tot}-(U_{i=0}{}^k\theta_i \cup V_p)]=\{1, 3, 4, 5\}$ includes the path stalling from the source node I to the sink node 5, the step b is executed.

The step b: as $|V_p|=3<L_{ub}=5$, the step b' is executed.

The step b': as the node 4 is the adjacent node of the node set $V_p=\{1, 5, 3\}$ and belongs to the set $[V_{tot}-(U_{i=0}{}^k\theta_i \cup V_p)]=\{4\}$, the node set $V_p$ includes the node 4, so $V_p=\{1, 5, 3, 4\}$; the counter k is added by 1, so k=2, and the second corresponding node set $\theta_2$ includes the node 4, $\theta_2=\{4\}$. Afterwards, the step c is executed.

The step c: as $L_{lb}=3<|V_p|=4$, the step d is executed.

The step d: as the network formed of the node set $V_p=\{1, 5, 3, 4\}$ includes the path p starting from the source node 1 to the sink node 5 via all the nodes in $V_p$, $p=\{e_{14}, e_{43}, e_{35}\}$, the minimal path set $\Omega$ includes the path p, and then the step e is executed.

The step e: as $L_{ub}=5>|V_p|=4$, the step e' is executed.

The step e': as there are no nodes that belong to the set $[V_{tot}-(U_{i=0}{}^k\theta_i \cup V_p)]=\{\ \}$ and are the close adjacent node of the node set $V_p$, the step b is executed.

The step b: as $V_p|=4<L_{ub}=5$, the step b' is executed.

The step b': as there are no nodes that belong to the set $[V_{tot}-(U_{i=0}{}^k\theta_i \cup V_p)]=\{\ \}$ and are the adjacent node of the node set $V_p$, the step f is executed.

The step f: as $L_{lb}=2<|V_p|=4$, the step f is executed.

The step f': as there are no nodes that belong to set $[V_{tot}-(U_{i=0}{}^k\theta_i \cup V_p)]=\{\ \}$ and are the adjacent node of the node set $V_p$, the last node 4 of the node set $V_p$ is deleted, so $V_p=\{1, 5, 3\}$; the count value k is subtracted by 1, so k=1, and then the step f is executed.

The step f: as $L_{lb}=2|V_p|=3$, the step f is executed.

The step f': as the node 4 belongs to the set $[V_{tot}-(U_{i=0}{}^k\theta_i \cup V_p)]=\{4\}$ and is the adjacent node of the set $V_p$, the node 4 replaces the last node 3 in the set $V_p$, so $V=\{1, 5, 4\}$, and the first corresponding node set $\theta_1$ includes the node 4, $\theta_2=\{2, 3, 4\}$. Afterwards, the step d is executed.

The step d: as the network formed of the node set $V_p=\{1, 4, 5\}$ includes the path p starting from the source node 1 to the sink node 5 via all the nodes in $V_p$, $p=\{e_{14}, e_{45}\}$, the minimal path set $\Omega$ includes the path p, and then the step e is executed.

The step e: as $L_{ub}=5>|V_p|=3$, the step e is executed.

The step e': as there are no nodes that belong to the set $[V_{tot}-(U_{i=0}{}^k\theta_i \cup V_p)]=\{\ \}$ and are the close adjacent node of the node set $V_p$, the step b is executed.

The step b: as $|V_p|=3<L_{ub}=5$, the step b' is executed.

The step b': as there are no nodes that belong to the set $[V_{tot}-(U_{i=0}{}^k\theta_i \cup V_p)]=\{\ \}$ and are the adjacent node of the node set $V_p$, the step f is executed.

The step f: as $L_{lb}=2<|V_p|=3$, the step f' is executed.

The step f': as there are no nodes that belong to the set $[V_{tot}-(U_{i=0}{}^k\theta_i \cup V_p)]=\{\ \}$ and are the adjacent node of the node set $V_p$, the last node 4 of the node set $V_p$ is deleted, so $V_p=\{1, 5\}$; and the count value is subtracted by 1, so k=0. Afterwards, the step f is executed.

The step f: as $L_{lb}=|V_p|=2$, the step g is executed.

The step g: the network reliability of the acyclic network is calculated according to all the paths $\{\{e_{12}, e_{23}, e_{35}\}, \{e_{14}, e_{42}, e_{23}, e_{35}\}, \{e_{14}, e_{43}, e_{35}\}, \{e_{14}, e_{45}\}\}$ in the minimal path set $\Omega$.

According to the forgoing description, it can be found that the network reliability evaluation method for an acyclic network is feasible to find out all the MPs of the acyclic network based on the nodes and to calculate the network reliability of the acyclic network according to all the MPs.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A network reliability evaluation method for an acyclic network, the acyclic network comprising a plurality of nodes and a plurality of arcs connected to the plurality of nodes, the plurality of nodes forming a total node set $V_{tot}$, the total node set $V_{tot}$ comprising a source node and a sink node, and the network reliability evaluation method comprising following steps:
   a. setting a node set $V_p$ comprising the source node and the sink node by a processor, setting a count value k to be 0, setting a minimal path set $\Omega$ to be a null set, setting a $0^{th}$ corresponding node set $\theta_0$ to be a null set, setting an upper limit value and a lower limit value corresponding to the acyclic network, and executing the step b;
   b. determining whether a number of the nodes in the node set $V_p$ is equal to the upper limit value by the processor, if so, executing the step f, if not, executing the step b';
   b'. determining whether there is a first node that belongs to a set $[V_{tot}-(U_{i=0}{}^k\theta_i \cup V_p)]$ and is an adjacent node of the node set $V_p$ by the processor, if so, the node set $V_p$ comprising the first node, adding the count value k by 1, setting the $k^{th}$ corresponding node set $\theta_k$ to be the first node, and executing the step c, if not, executing the step f;

c. determining whether the lower limit value is greater than the number of the nodes in the node set $V_p$ by the processor, if so, executing the step b, if not, executing the step d;

d. determining whether there is a path p formed of the plurality of arcs among the nodes in the node set $V_p$ passing all the nodes in the node set $V_p$ started from the source node to the sink node by the processor, if so, the minimal path set $\Omega$ comprising the path p and executing the step e, if not, executing the step d';

d'. determining whether there is a path p formed of the a plurality of arcs among the nodes in the node set $V_p$ without passing all the nodes in the node set $V_p$ started from the source node to the sink node or the other paths starting from the source node to the sink node is existing in the network formed of the set $[V_{tot}-(U_{i=0}{}^k\theta_i-V_p)]$ by the processor, if so, executing the step b, if not, executing the step f;

e. determining whether the number of the nodes of the node set $V_p$ is equal to the upper limit value by the processor, if so, executing the step f, if not, executing the step b;

f. determining whether the number of the nodes of the node set $V_p$ is equal to 2, if so, executing the step g, if not, executing the step f';

f'. determining whether there is a second node that belongs to the set $[V_{tot}-(U_{i=0}{}^k\theta_i\cup V_p)]$ and is the adjacent node of the node set $V_p$, if so, the second node replacing the last node in the node set $V_p$, the $k^{th}$ corresponding node set $\theta_k$ comprising the second node, and executing the step d, if not, deleting the last node in the node set $V_p$, subtracting the count value k by 1, and executing the step f, and g. calculating a network reliability by the processor according to all the paths comprised in the minimal path set $\Omega$.

2. The network reliability evaluation method of claim 1, wherein the lower limit value is the number of the nodes in a shortest path starting from the source node to the sink node.

3. The network reliability evaluation method of claim 1, wherein the upper limit value is the number of the nodes in a longest path starting from the source node to the sink node.

4. The network reliability evaluation method of claim 1, wherein after the processor determines that the number of the nodes is not equal to the upper limit value in the step e and before the step b is executed, the network reliability evaluation method further comprises the step e': determining whether there is a third node v that belongs to the set $[V_{tot}-(U_{i=0}{}^k\theta_i\cup V_p)]$ and is a close adjacent node of the node set $V_p$ by the processor, if so, setting the node set $V_p$ comprising the third node v, adding the count value k by 1, setting the $k^{th}$ corresponding node set $\theta_k$ comprising the third node v, and the minimal path set $\Omega$ comprising the path $(p=\{e_{ij}\})\cup(\{e_{iv}\},\{e_{vj}\})$, wherein $e_{ij}$ denotes an arc between a node i and a node j in the node set $V_p$, $e_{iv}$ denotes an arc between the node i and the third node v, $e_{vj}$ denotes an arc between the third node v and the node j and the step e is executed, if not, the step b is executed.

5. A network reliability evaluation system for an acyclic network, the acyclic network comprising a plurality of nodes and a plurality of arcs connected to the plurality of nodes, the plurality of nodes forming a total node set $V_{tot}$, the total node set $V_{tot}$ comprising a source node and a sink node, and the network reliability evaluation system comprising:

a memory storing an algorithm, and a processor connecting to the acyclic network and the memory, and outputting a network reliability after the algorithm is executed, wherein, the algorithm comprises following steps:

a. setting a node set $V_p$ comprising the source node and the sink node, setting a count value k to be 0, setting a minimal path $\Omega$ to be a null set, setting a $0^{th}$ corresponding node set $\theta_0$ to be a null set, setting an upper limit value and a lower limit value corresponding to the acyclic network, and executing the step b;

b. determining whether a number of the nodes of the node set $V_p$ is equal to the upper limit value, if so, executing the step f, if not, executing the step b';

b' determining whether there is a first node that belongs to the set $[V_{tot}-(U_{i=0}{}^k\theta_i\cup V_p)]$ and is an adjacent node of the node set $V_p$, if so, the node set $V_p$ comprising the first node, adding the count value k by 1, setting the $k^{th}$ corresponding node set $\theta_k$ to be the first node, and executing the step c, if not, executing the step f;

c. determining whether the lower limit value is greater than the number of the nodes in the node set $V_p$, if so, executing the step b, if not, executing the step d;

d. determining whether there is a path p formed of the plurality of arcs among the nodes in the node set $V_p$ passing all the nodes in the node set $V_p$ started from the source node to the sink node, if so, the minimal path set $\Omega$ comprising the path p and executing the step e; if not, executing the step d';

d' determining whether there is a path p formed of the a plurality of arcs among the nodes in the node set $V_p$ without passing all the nodes in the node set $V_p$ started from the source node to the sink node or the other paths starting from the source node to the sink node is existing in the network formed of the set $[V_{tot}-(U_{i=0}{}^k\theta_i-V_p)]$, if so, executing the step b, if not, executing the step f;

e. determining whether the number of the nodes of the node set $V_p$ is equal to the upper limit value, if so, executing the step f, if not, executing the step b;

f. determining whether the number of the nodes of the node set $V_p$ is equal to 2, if so, saving the minimal path set $\Omega$ at the memory and executing the step g, if not, executing, the step f';

f'. determining whether there is a second node that belongs to the set $[V_{tot}-(U_{i=0}{}^k\theta_i\cup V_p)]$ and is the adjacent node of the node set $V_p$, if so, the second node replacing the last node in the node set $V_p$, the $k^{th}$ corresponding node set $\theta_k$ comprising the second node, and executing the step d, if not, deleting the last node in the node set $V_p$, subtracting the count value k by 1, and executing the step f, and g. calculating the network reliability according to all the paths comprised in the minimal path set $\Omega$.

6. The network reliability evaluation system of claim 5, wherein the lower limit value is the number of the nodes comprised in a shortest path starting from the source node to the sink node.

7. The network reliability evaluation system of claim 5, wherein the upper limit value is a number of the nodes comprised in a longest path starting from the source node to the sink node.

8. The network reliability evaluation system of claim 5, wherein after the algorithm determines that the number of the nodes is not equal to the upper limit value in the step e and before the step b is executed, the algorithm further comprises the step e': determining whether there is a third node v that belongs to the set $[V_{tot}=(\cup_{i=0}^{k}\theta_i \cup V_p)]$ and is a close adjacent node of the node set $V_p$ by the processor, if so, the node set $V_p$ comprising the third node v, adding the count value k by 1, setting the $k^{th}$ corresponding node set $\theta_k$ comprising the third node v, and the minimal path set $\Omega$ comprising the path $(p=\{e_{ij}\})\cup(\{e_{iv}\},\{e_{vj}\})$, wherein $e_{ij}$ denotes an arc between a node i and a node j in the node set $V_p$, $e_{iv}$ denotes an arc between the node i and the third node v, $e_{vj}$ denotes an arc between the third node v and the node j, and the step e is executed, if not, the step b is executed.

\* \* \* \* \*